(12) United States Patent
Adragna et al.

(10) Patent No.: US 9,520,796 B2
(45) Date of Patent: *Dec. 13, 2016

(54) CONTROL METHOD AND DEVICE FOR QUASI-RESONANT HIGH-POWER-FACTOR FLYBACK CONVERTER

(71) Applicant: STMICROELECTRONICS S.R.L., Agrate Brianza (IT)

(72) Inventors: Claudio Adragna, Monza (IT); Giovanni Gritti, Bergamo (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 90 days.

This patent is subject to a terminal disclaimer.

(21) Appl. No.: 14/572,638

(22) Filed: Mar. 6, 2015

(65) Prior Publication Data
US 2016/0261199 A1    Sep. 8, 2016

(51) Int. Cl.
*H02M 1/08*     (2006.01)
*H02M 3/335*    (2006.01)
*H02M 1/42*     (2007.01)

(52) U.S. Cl.
CPC ........... *H02M 3/33523* (2013.01); *H02M 1/42* (2013.01)

(58) Field of Classification Search
CPC ............................ H02M 1/08; H02M 3/33515
USPC .................................................. 363/21.01, 97
See application file for complete search history.

(56) References Cited

U.S. PATENT DOCUMENTS

| 5,729,443 | A | 3/1998 | Pavlin |
| 6,181,120 | B1 | 1/2001 | Hawkes et al. |
| 6,356,466 | B1 | 3/2002 | Smidt et al. |
| 6,853,563 | B1 | 2/2005 | Yang et al. |
| 6,944,034 | B1 | 9/2005 | Shteynberg et al. |
| 7,425,857 | B2 | 9/2008 | Confalonieri et al. |
| 8,467,209 | B2 | 6/2013 | Adragna |
| 8,686,668 | B2 | 4/2014 | Grotkowski et al. |
| 2012/0026765 | A1 | 2/2012 | Adragna |
| 2012/0281438 | A1* | 11/2012 | Fang ................ H02M 3/33515 363/21.12 |
| 2013/0070485 | A1* | 3/2013 | Li ...................... H02M 1/4258 363/21.01 |
| 2013/0088897 | A1 | 4/2013 | Adragna |

(Continued)

OTHER PUBLICATIONS

Adragna, C., "Design Equations of High-Power-Factor Flyback Converters Based on the L6561," AN 1059 (Application Note), STMicroelectronics, pp. 1-20, Sep. 2003.

(Continued)

*Primary Examiner* — Jeffrey Sterrett
(74) *Attorney, Agent, or Firm* — Seed IP Law Group LLP

(57) ABSTRACT

The present disclosure is directed to a high power factor quasi resonant converter. The converter converts an AC power line input to a DC output to power a load, generally a string of LEDs. The power input is fed into a transformer being controlled by a power switch. The power switch is driven by a controller having a shaping circuit. The shaping circuit uses a current generator, switched resistor and capacitor to produce a sinusoidal reference voltage signal. The controller drives the power switch based on the voltage reference signal, resulting in a sinusoidal input current in a primary winding of the transformer, resulting in high power factor and low total harmonic distortion for the converter.

20 Claims, 12 Drawing Sheets

(56) References Cited

U.S. PATENT DOCUMENTS

2013/0114308 A1* 5/2013 Liao ............... H02M 3/33507
363/21.01
2016/0172981 A1 6/2016 Gritti et al.

OTHER PUBLICATIONS

Adragna, C., "Primary-Controlled High-PF Flyback Converters Deliver Constant Dc Output Current," Proceedings of the 2011-14$^{th}$ European Conference on Power Electronics and Applications (EPE 2011), Aug. 30-Sep. 1, 2011, pp. 1-10.
Erickson, R. et al., "Design of a Simple High-Power-Factor Rectifier based on the Flyback Converter", Applied Power Electronics Conference and Exposition, 1990, APEC '90, Conference Proceedings 1990, pp. 792-801, Mar. 1990.

* cited by examiner

CONTROL METHOD AND DEVICE FOR QUASI-RESONANT HIGH-POWER-FACTOR FLYBACK CONVERTER

BACKGROUND

1. Technical Field

The present disclosure relates to converters and, more particularly, to a control device for quasi-resonant AC/DC off-line converters.

2. Description of the Related Art

Converters, and particularly offline drivers of LED-based lamps for bulb replacement, are often desired to have a power factor greater than 0.9, low total harmonic distortion (THD) and to provide safety isolation. At the same time, for cost reasons, it is desirable to regulate the output DC current required for proper LED driving without closing a feedback loop.

High-power-factor (hi-PF) flyback converters are able to meet power factor and isolation specifications with a simple and inexpensive power stage. In a hi-PF flyback converter there is not an energy reservoir capacitor directly connected across the DC side of the input rectifier bridge, so that the voltage applied to the power stage is a rectified sinusoid. To achieve high-PF, the input current must track the input voltage, thus originating a time-dependent input-to-output power flow. As a result, the output current contains a large AC component at twice the main line's frequency.

A quasi-resonant flyback converter has the power switch turn-on synchronized to the instant the transformer demagnetizes (i.e. the secondary current has become zero), normally after an appropriate delay. This allows the turn-on to occur on the valley of the drain voltage ringing that follows the demagnetization, often termed "valley-switching." Most commonly, peak current mode control is used, so the turn-off of the power switch is determined by the current sense signal reaching the value programmed by the control loop that regulates the output voltage or current.

In a flyback converter the input current is the average of the primary current, which flows only during the ON-time of the power switch, resulting in a series of triangles separated by voids corresponding to the OFF-time of the power switch. This "chopping" causes the average value of the primary current to be lower than half the peak value and depend on the mark-space ratio of the triangles. As a result, the input current is no longer proportional to the envelope of the peaks and unlike the envelope, which is sinusoidal, the input current is not sinusoidal. Although a sinusoidal-like shape is maintained, the input current is distorted. This distorted sinusoidal input current results in a flyback converter that fails to achieve low THD or unity power factor.

FIG. 1 shows a schematic of a high power factor (Hi-PF) quasi resonant (QR) flyback converter 30 according to the prior art. On the primary side, the flyback converter 30 comprises a bridge rectifier 34 having inputs 32, configured to receive an AC voltage from an AC power line, a first output connected to ground, and a second output at which the rectifier is configured to produce a rectified voltage $V_{in}(\theta)$. The converter 30 also includes a capacitor $C_{in}$, which serves as a high-frequency smoothing filter, connected across the output terminals of the bridge rectifier 34, with a negative terminal connected to ground. A primary winding $L_p$ of a transformer 36 has one end connected to the positive terminal of the capacitor $C_{in}$ and the transformer 36 also includes an auxiliary winding $L_{aux}$ coupled to a resistor $R_{ZCD}$. The other end of the primary winding $L_p$ is connected to the drain of a power switch M. The power switch M has a source terminal connected to ground via a sensing resistor Rs, the resistor $R_S$ allowing reading of the current flowing through M (i.e. the current flowing through $L_p$ when M is ON) as a positive voltage drop across the resistor Rs itself. A controller 38 controls the power switch M. The primary side of the converter also includes a resistive voltage divider, made up of resistors $R_a$ and $R_b$ connected in parallel with the capacitor $C_{in}$, and a clamp circuit 39 that clamps the spikes on the drain voltage due to the leakage inductance of the primary winding $L_p$.

On the secondary side of the converter, a secondary winding $L_s$ of the transformer 36 has one end connected to the secondary ground and the other end connected to the anode of a diode D having a cathode connected to the positive plate of a capacitor $C_{out}$ that has its negative plate connected to the secondary ground. This flyback converter 30 generates at its output terminals across $C_{out}$ a DC voltage $V_{out}$ that will supply a load (not shown). The load is generally a string of high-brightness LEDs.

The quantity to be regulated (either the output voltage $V_{out}$ or the output current $I_{out}$) is compared to a reference value and an error signal $I_{FB}$ depending on their difference is generated. This signal is transferred to the primary side by an isolated feedback block 40, typically implemented by an optocoupler (or other means able to cross the isolation barrier complying with the safety requirements of IEC60950). On the primary side, this error signal is a current $I_{FB}$ that is sunk from a dedicated pin FB in the controller 38, producing a control voltage $V_c$ on said pin FB. If the open-loop bandwidth of the overall control loop, determined by a frequency compensation network located inside the isolated feedback block 40, is narrow enough—typically below 20 Hz—and a steady-state operation is assumed, the control voltage $V_c$ can be regarded as a DC level, at least to a first approximation.

Inside the controller 38, control voltage $V_c$ is internally fed into one input of a multiplier block 42, having another input that receives, via a pin MULT and a midpoint of the resistive divider $R_a/R_b$, a portion of the instantaneous rectified line voltage $V_{in}(\theta)$ sensed across $C_{in}$.

The output of the multiplier block 42 is the product of a rectified sinusoid times a DC level, then still a rectified sinusoid whose amplitude depends on the rms line voltage $V_{in}(\theta)$ and the amplitude of the control voltage $V_c$; this will be the reference voltage $Vcs_{REF}(\theta)$ for the peak primary current.

The $Vcs_{REF}(\theta)$ signal is fed to the inverting input of a pulse width modulation comparator 44 that receives at its non-inverting input the voltage $Vcs(t, \theta)$, sensed across the sense resistor Rs, which is a voltage proportional to the instantaneous current $I_p(t, \theta)$ flowing through the primary winding $L_p$ of the transformer 36 and the power switch M when the power switch is ON. Assuming power switch M is initially ON, the current through the primary winding $L_p$ will be ramping up and so will the voltage across Rs. When $Vcs(t, \theta)$ equals $Vcs_{REF}(\theta)$ the PWM comparator 44 resets a SR flip-flop 46, which switches off the power switch M. Therefore, the output of the multiplier 42, shaped as a rectified sinusoid, determines the peak value of the current in the primary winding $L_p$ that, as a result, will be enveloped by a rectified sinusoid.

When the power switch M is switched off, the energy stored in the primary winding $L_p$ is transferred by magnetic coupling to the secondary winding $L_s$ and then dumped into the output capacitor $C_{out}$ and the load until the secondary winding $L_s$ is completely demagnetized. At this point, the diode D opens and the drain node, which was fixed at $V_{in}(\theta)+V_R$ while the secondary winding $L_s$ and the diode D were conducting, becomes floating. The drain node voltage would tend to eventually reach the instantaneous line voltage $V_{in}(\theta)$ through a damped ringing due to its parasitic capacitance that starts resonating with the primary winding $L_p$. The quick drain voltage fall that follows transformer 36 demagnetizing is coupled to a pin ZCD of the controller 38 through the auxiliary winding $L_{aux}$ and the resistor $R_{ZCD}$. A zero-crossing detector (ZCD) block 48 releases a pulse every time it detects a negative-going edge falling below a threshold and this pulse sets the SR flip flop 46 and drives ON the power switch M, starting a new switching cycle.

An OR gate 50 between the ZCD block 48 and the set input of the SR flip flop 46 allows the output of a starter block 52 to initiate a switching cycle. The starter block 52 produces a signal at power-on when no signal is available on the pin ZCD input and prevents the converter 30 from getting stuck in case the signal on the pin ZCD input is lost for any reason.

Assuming $\theta \in (0, \pi)$, according to the control scheme under consideration the peak envelope of the primary current is given by:

$$I_{pkp}(\theta)=I_p(T_{ON},\theta)=I_{PKp} \sin \theta.$$

It is worth noticing that this scheme results in a constant ON-time $T_{ON}$ of the power switch M:

$$T_{ON} = L_p \frac{I_{PKp}\sin\theta}{V_{PK}\sin\theta} = L_p \frac{I_{PKp}}{V_{PK}}$$

For simplicity, the OFF-time $T_{OFF}(\theta)$ of the power switch M will be considered coincident with the time $T_{FW}(\theta)$ during which current circulates on the secondary side. In other words, the time interval $T_R$ during which the voltage across the primary switch rings until reaching the valley of the ringing will be neglected. This is acceptable as long as $T_R \ll T_{OFF}(\theta)$.

The switching period $T(\theta)$ is therefore given by:

$$T(\theta)=T_{ON}+T_{FW}(\theta).$$

Considering volt-second balance across the primary winding $L_p$ it is possible to write:

$$T_{FW}(\theta) = T_{ON} \frac{V_{PK}\sin\theta}{V_R}.$$

where $V_R$ is the reflected voltage, i.e. the output voltage $V_{out}$ times the primary-to-secondary turns ratio $n=N_p/N_s$, seen across the primary winding $L_p$ of the transformer 36 in the time interval $T_{FW}(\theta)$:

$$V_R=n(V_{out}+V_F)$$

wherein $V_F$ is the forward drop on the secondary diode D. Therefore, $T(\theta)$ can be rewritten as:

$$T(\theta)=T_{ON}(1+K_v \sin \theta)$$

with $K_v=V_{PK}/V_R$.

The input current to the converter 30 is found by averaging the primary current $I_p(t,\theta)$ in the primary winding $L_p$ over a switching cycle. $I_p(t,\theta)$ is the series of gray triangles in the right-hand side diagram of FIG. 2 so it is found that:

$$I_{in}(\theta) = \frac{1}{2}I_{pkp}(\theta)\frac{T_{ON}}{T(\theta)} = \frac{1}{2}I_{PKp}\frac{\sin\theta}{1+K_v\sin\theta}. \quad (1)$$

This shows that the input current is not a pure sinusoid. The function $\sin \theta/(1+K_v \sin \theta)$, plotted in FIG. 3a for different values of $K_v$, is a periodic even function, at twice the line frequency. Conversely, the current drawn from the mains will be its "odd counterpart," at the line frequency, as shown in FIG. 3b.

This current is sinusoidal only for $K_v=0$; when $K_v \neq 0$, although a sinusoidal-like shape is maintained, the input current is distorted, the higher $K_v$ the higher the distortion. Since $K_v$ cannot be zero (which would require the reflected voltage to tend to infinity), this prior art QR control scheme does not permit zero total harmonic distortion (THD) of the input current nor unity power factor in the flyback converter 30 even in the ideal case.

FIG. 4, shows the plots of the THD of the input current and of the Power Factor vs. $K_v$ for the converter 30 of FIG. 1.

Although the distortion is significant, especially at high line (i.e. high $K_v$), the individual harmonics are still well within the limits considered by the regulation on the limits for harmonic current emissions, the IEC61000-3-2 (or its Japanese homologous, the JEIDA-MITI). An example of harmonic measurements on a real-world application is shown in FIG. 5. For this reason the Hi-PF QR flyback converter is currently widely used, especially in solid stating lighting (SSL) applications where safety isolation from the power line is required by regulations. These include LED drivers from few watts to few ten watts for residential and professional lighting.

Still considering the SSL market, recently this inherent distortion is becoming a problem. In fact, as shown in the plot of FIG. 4, it is difficult to meet the target THD<10% (or even lower) that is becoming a market specification in some geographical areas. Low values of Kv should be used even at high line, which means a high reflected voltage $V_R$; since the power MOSFET in a flyback converter should be rated for a breakdown voltage significantly larger than $V_{PKmax}+V_R$, in principle a high $V_R$ is provided using a high voltage rating MOSFET, which is more expensive and has higher parasitic losses. In practice, the target $V_R$ might be so high that a MOSFET with adequate voltage rating could be prohibitive in terms of cost or originate too much power loss, or even be unavailable.

BRIEF SUMMARY

One embodiment of the present disclosure is a quasi-resonant flyback converter having a sinusoidal input current that achieves low total harmonic distortion and high power factor.

One embodiment of the present disclosure is directed to a control circuit that enables Hi-PF QR flyback converters with peak current mode control to draw a sinusoidal current from the input source.

One embodiment of the present disclosure is directed to a device for controlling a power transistor of a power circuit. The device has a driver circuit, the driver circuit including a first input configured to receive a voltage reference signal, and an output configured to drive the power transistor based on the voltage reference signal. A driver control circuit is configured to provide the voltage reference signal to the driver circuit, with the driver control circuit including a multiplier having a first input configured to receive a first signal based on an feedback signal from the power circuit, a second input configured to receive a second signal, and an output, the multiplier being configured to produce a multiplier signal based on a multiplication of the first and second signals. The driver control circuit also includes a first current generator coupled to the multiplier and configured to produce a current reference signal, a resistor coupled to an output of the first current generator, and a switch configured to couple the resistor in parallel with a capacitor when the power transistor is on.

DETAILED DESCRIPTION

This disclosure presents a novel control method that enables Hi-PF QR flyback converters with peak current mode control to ideally draw a sinusoidal current from the input source, thus performing like boost converters operated in the same way.

Figure 2:
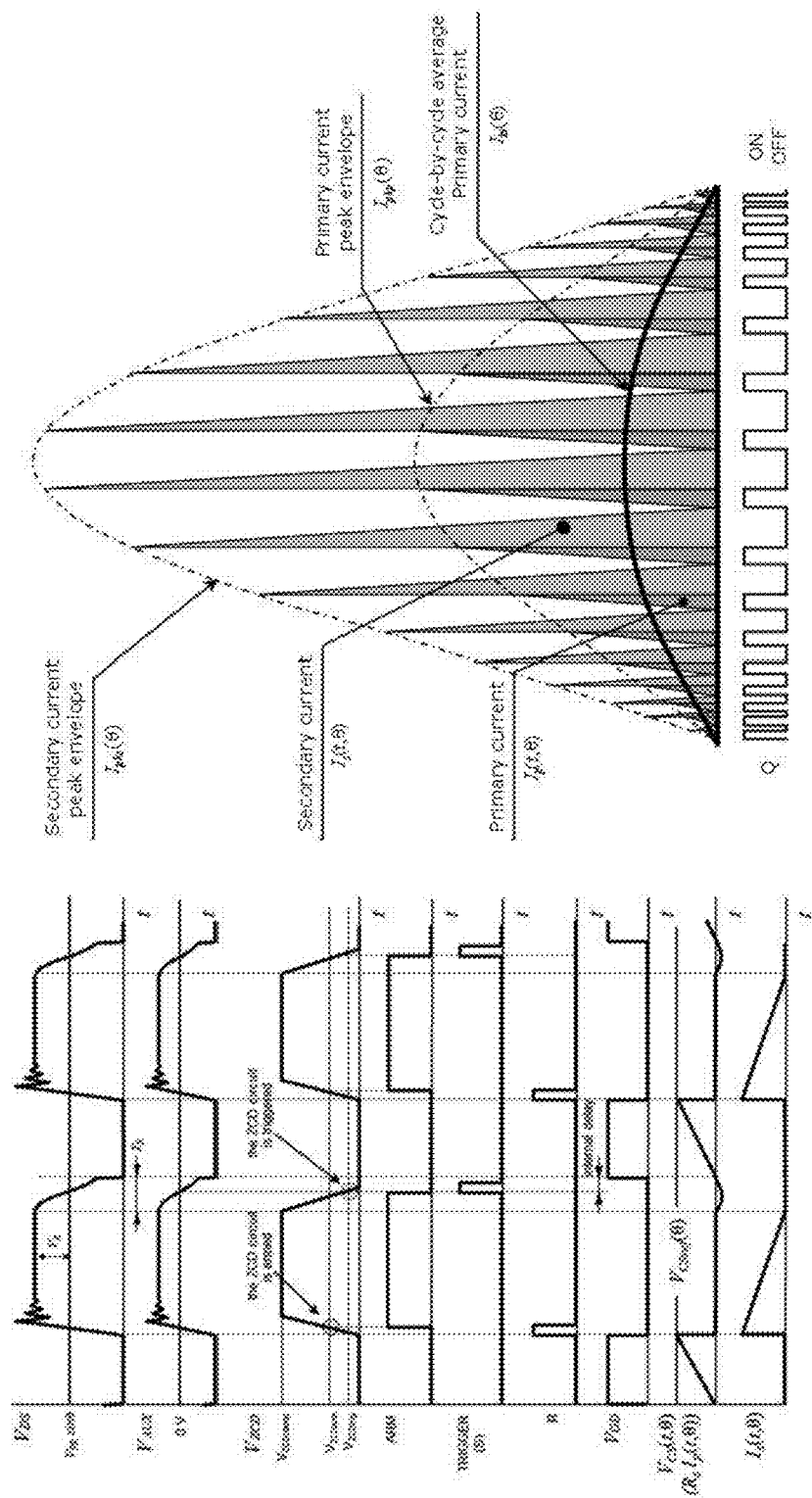
FIG. 2 shows the waveforms of the circuit in FIG. 1 during normal operation.
Figure 3B:
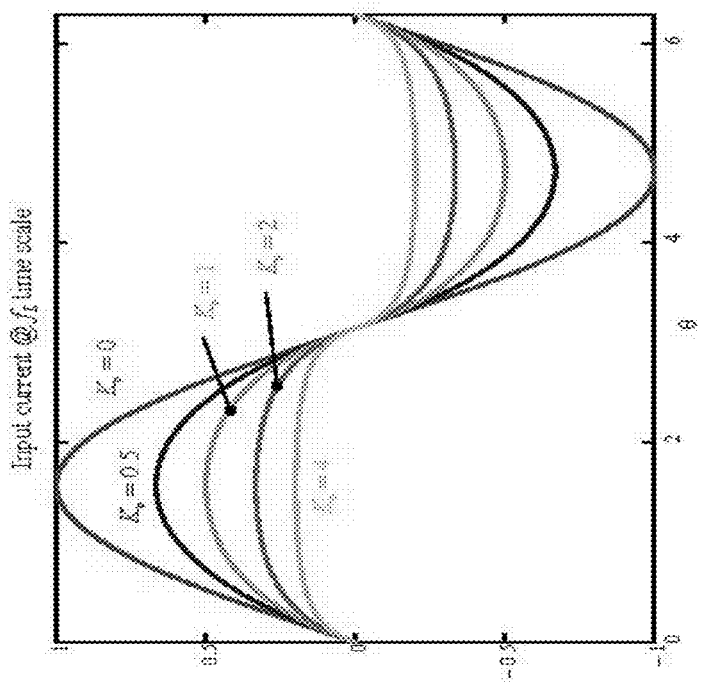
FIG. 3b shows the shape of the input current in the circuit of FIG. 1.
Figure 3A:
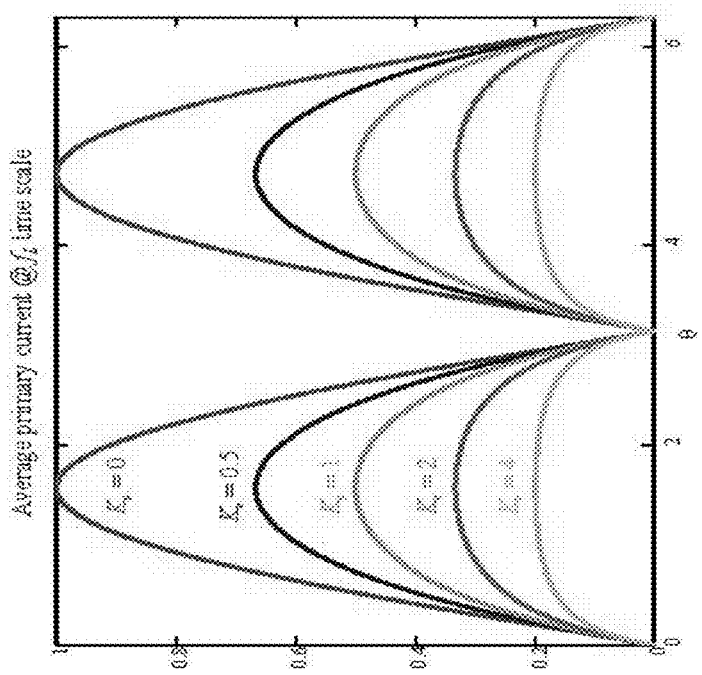
FIG. 3a shows the shape of the average primary current in the circuit of FIG. 1.
Figure 4:
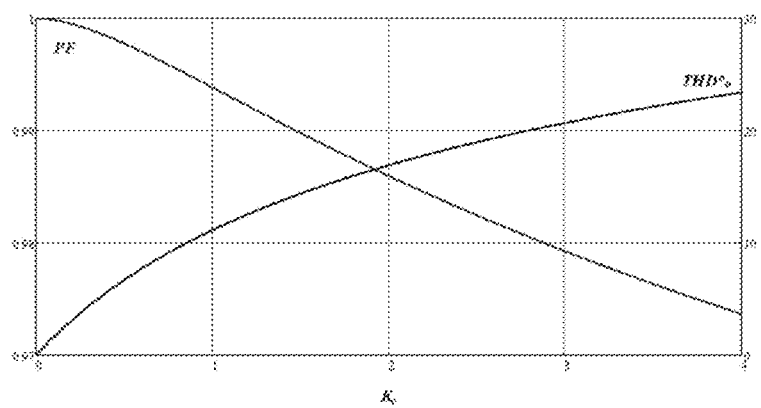
FIG. 4 shows the plot of the THD of the input current and the power factor obtained with the circuit of FIG. 1.
Figure 5:
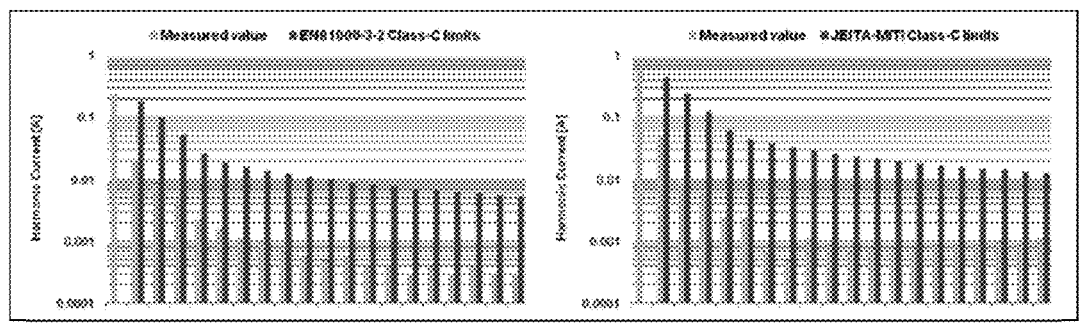
FIG. 5 shows a harmonic test results in a Hi-PF QR Flyback converter of FIG. 1.
Figure 6:
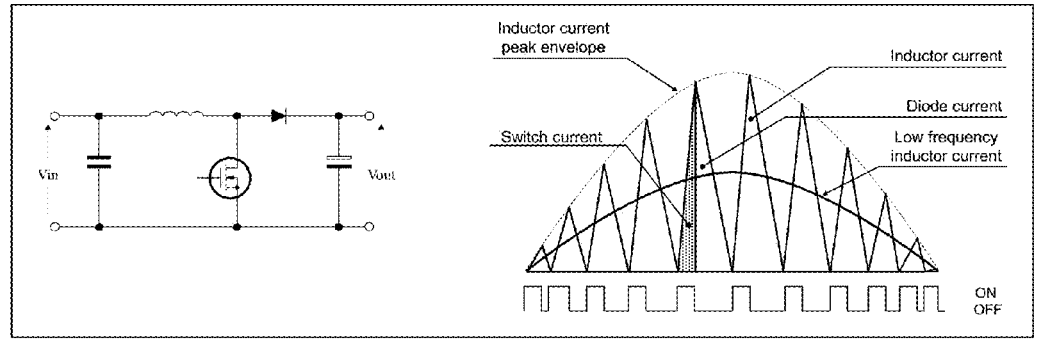
FIG. 6 shows a boost converter and the current waveforms on a line cycle time scale.

One idea of the present disclosure stems from observing the waveforms shown on the right-hand side of FIG. 2 and comparing them to those of a boost converter (shown in FIG. 6 along with the topology). In the boost converter, the input current is the average of the inductor current, which flows both during the ON-time and the OFF-time of the power switch. As a result, being a series of contiguous triangles, the average value of the inductor current is half the peak. Also, given that the envelope of the peaks is sinusoidal, the input current will be sinusoidal.

Figure 1:
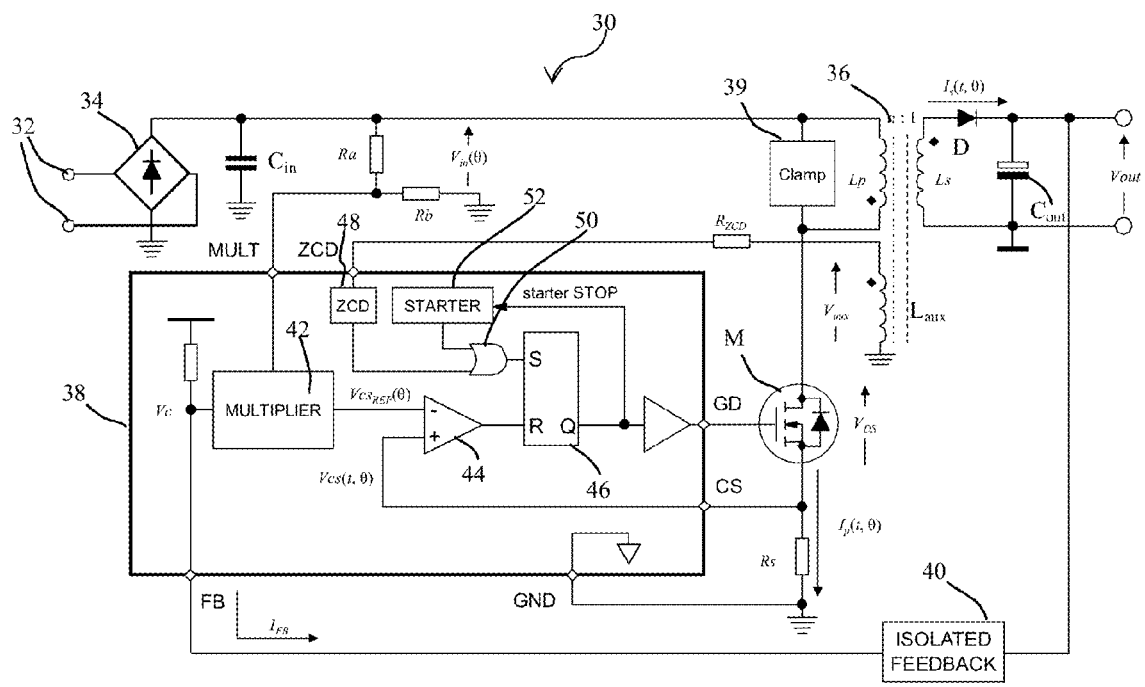
FIG. 1 shows a schematic of a Hi-PF QR flyback converter according to the prior art.

In contrast, in the prior art flyback converter of FIG. 1, the input current is the average of the primary current, which flows only during the ON-time of the power switch and is a series of triangles separated by voids corresponding to the OFF-time of the power switch, as shown in FIG. 2. This "chopping" causes the average value of the primary current to be lower than half the peak value and depending on the mark-space ratio of the triangles. As a result, the input current is no longer proportional to the envelope of the peaks and, unlike the envelope that is sinusoidal, the input current will not be sinusoidal.

To express this quantitatively, it is worth re-examining (1):

$$I_{in}(\theta) = \frac{1}{2} I_{pkp}(\theta) \frac{T_{ON}}{T(\theta)}.$$

The term $I_{pkp}(\theta)$, which represents the peak envelope of the primary current, is sinusoidal so the distortion is originated by the term $T_{ON}/T(\theta)$, introduced by the primary current being chopped, which is not constant ($T_{ON}$ is constant but $T(\theta)$ is not).

The inventors discovered that if the current reference $Vcs_{REF}(\theta)$ that determines $I_{pkp}(\theta)$ is distorted with a term $T(\theta)/T_{ON}$, this will cancel out the term $T_{ON}/T(\theta)$ introduced by averaging and result in a sinusoidal average primary current, i.e. in a sinusoidal input current. Then, the control objective can be expressed in the following terms:

$$Vcs_{REF}(\theta) = Vcs_x \sin\theta \frac{T(\theta)}{T_{ON}(\theta)} \qquad (2)$$

wherein $T_{ON}$ is denoted as a function of the instantaneous line phase $\theta$. In fact, with a method different from that of the prior art it is not necessarily constant.

Figure 7:
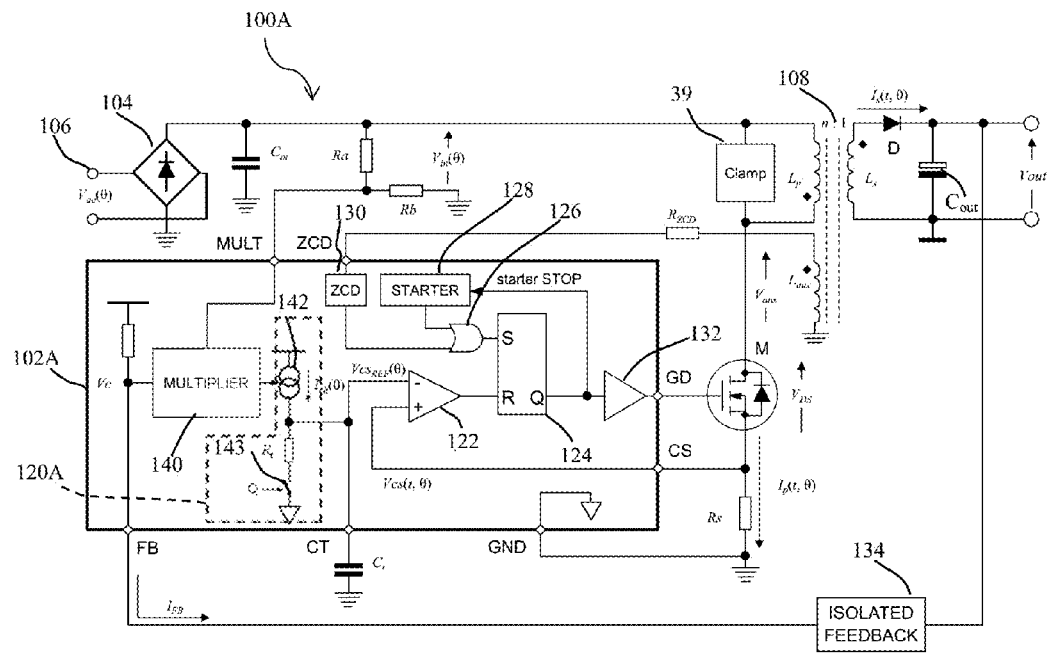
FIG. 7 illustrates the schematic of a Hi-PF QR flyback converter according to the present disclosure.

FIG. 7 shows a hi-PF flyback converter 100A according to one embodiment of the present disclosure. The converter 100A of FIG. 7 has on the primary side a bridge rectifier 104 having inputs 106, configured to receive an AC voltage from an AC power line, a first output connected to ground, and a second output at which the rectifier is configured to produce a rectified voltage $V_{in}(\theta)$. The converter 100A also includes a capacitor $C_{in}$, which serves as a high-frequency smoothing filter, connected across the output terminals of the bridge rectifier 104, with a negative terminal connected to ground. A primary winding $L_p$ of a transformer 108 has one end connected to the positive terminal of the capacitor $C_{in}$ and includes an auxiliary winding $L_{aux}$. The other end of the primary winding $L_p$ is connected to the drain of a power switch M. The power switch M has a source terminal connected to ground via a sensing resistor Rs, the resistor $R_S$ allowing reading of the current flowing through M (i.e. the current flowing through $L_p$ when M is ON) as a positive voltage drop across the resistor Rs itself. A controller 102A controls the power switch M. As in the converter 30 of FIG. 1, the converter 100A includes the resistive voltage divider $R_a/R_b$ connected in parallel with the capacitor $C_{in}$, and the clamp circuit 39.

On the secondary side of the converter 100A, a secondary winding $L_s$ of the transformer 108 has one end connected to a secondary ground and the other end connected to the anode of a diode D having the cathode connected to the positive plate of a capacitor $C_{out}$ that has its negative plate connected to the secondary ground. An output voltage $V_{out}$ supplies power to a load (not shown). The quantity to be regulated (either the output voltage $V_{out}$ or the output current $I_{out}$) is compared to a reference value and an error signal $I_{FB}$ is generated. This signal is transferred to the primary side by an isolated feedback block 134, typically implemented by an optocoupler (or other means able to cross the isolation barrier complying with the safety requirements of IEC60950). On the primary side, this error signal $I_{FB}$ is sunk from a dedicated pin FB in the controller 102A, producing a control voltage $V_c$ on said pin FB. The open-loop bandwidth of the overall control loop is determined by a frequency compensation network located inside the isolated feedback block 134.

The controller 102A has a shaper circuit 120A, a PWM comparator 122, an SR flip flop 124, an OR gate 126, a starter block 128, a ZCD block 130, and a driver 132. The shaper circuit 120A is configured to produce a reference voltage $V_{CSREF}$ based on a voltage $V_c$ and a portion of the instantaneous rectified line voltage $V_{in}(\theta)$ received from the midpoint of the resistive divider $R_a/R_b$ via the pin MULT. The PWM comparator 122 is configured to receive as inputs the reference voltage $V_{CSREF}$ and the voltage $V_{CS}$ sensed at the resistor $R_S$. The SR flip flop 124 has reset and set inputs R, S that respectively receive the output of the PWM comparator 122 and the output of the OR gate 126. The driver 132 receives as an input the output of the SR flip flop 124, and configured to drive the power switch M via an output signal provided to a terminal GD coupled to the gate of the power switch M. The ZCD block 130 is configured to release a pulse when a detected falling edge of a signal, received from the auxiliary winding $L_{aux}$ and resistor $R_{ZCD}$ via the terminal ZCD, goes below a threshold value. The starter block 128 is configured to release a pulse on start-up or when the ZCD block 130 receives no input signal. The OR gate 126 has inputs that respectively receive the outputs of the starter block 128 and ZCD block 130 and provides a set signal to the set input S of the flip-flop 124 when either of the outputs from the starter block 128 and ZCD block 130 is positive.

A multiplier 140 is coupled to the shaper circuit 120A. The shaper circuit 120A has a current generator 142, a resistor $R_t$, and a switch 143 that switchably couples the resistor $R_t$ to ground. The multiplier 140 has a first input that receives the voltage $V_c$, a second input that receives the portion of the line voltage $V_{in}(\theta)$ from the terminal MULT, and an output at which the multiplier produces a multiplied voltage that is the product of the two voltages received at the inputs. The current generator 142 is controlled by the output of the multiplier 140 and is configured to output a current $I_{ch}(\theta)$ that acts on the switched resistor $R_t$ and an external capacitor $C_t$ having one terminal connected to ground.

The resistor $R_t$ is connected in parallel to the capacitor $C_t$ when a signal Q provided to the control terminal of the switch 143 is high. The signal Q is provided by the output of the SR flip-flop 124 and is high during the on-time of the power switch M. The switch 143 disconnects the resistor $R_t$ from ground when the signal Q is low, i.e. during the off-time of the power switch M. The voltage developed across $C_t$ is the reference voltage $V_{CS_{REF}}(\theta)$ and is fed to the inverting input of the PWM comparator 122.

In one embodiment of the present disclosure $C_t$ is integrated in a semiconductor chip with the controller 102A, thus saving one pin of the controller 102A and one external component.

The current $I_{ch}(\theta)$ provided by the current generator 142 can be expressed as:

$$I_{ch}(\theta) = g_m K_M K_p (V_{PK} \sin\theta) V_c$$

where $g_m$ is the voltage-to-current gain of the current generator 142, $K_M$ is the gain of the multiplier, $K_p$ is the divider ratio of the resistive divider $R_a/R_b$, and $V_{PK} \sin(\theta)$ is the peak value of the line voltage $V_{in}(\theta)$. Note that the control voltage $V_c$ is nearly constant along a line half-cycle, thus the charging current $I_{ch}(\theta)$ has a sinusoidal shape.

An assumption for the following analysis is that $T(\theta) \ll R_t C_t \ll 1/f_L$. In this way, the switching frequency ripple across the capacitor $C_t$ is negligible and the current $I_{ch}(\theta)$ can be considered constant within each switching cycle.

The reference voltage $V_{CS_{REF}}(\theta)$ developed across the capacitor $C_t$ by charge balance is therefore:

$$V_{CS_{REF}}(\theta) = R_t I_{ch}(\theta) \frac{T(\theta)}{T_{ON}(\theta)} = R_t g_m K_M K_p V_c (V_{PK} \sin\theta) \frac{T(\theta)}{T_{ON}(\theta)},$$

The control circuit in FIG. 7 therefore meets the control objective (2) and achieves a sinusoidal input current in the Hi-PF QR flyback converter 100A, resulting in high power factor and low total harmonic distortion.

Figure 8:
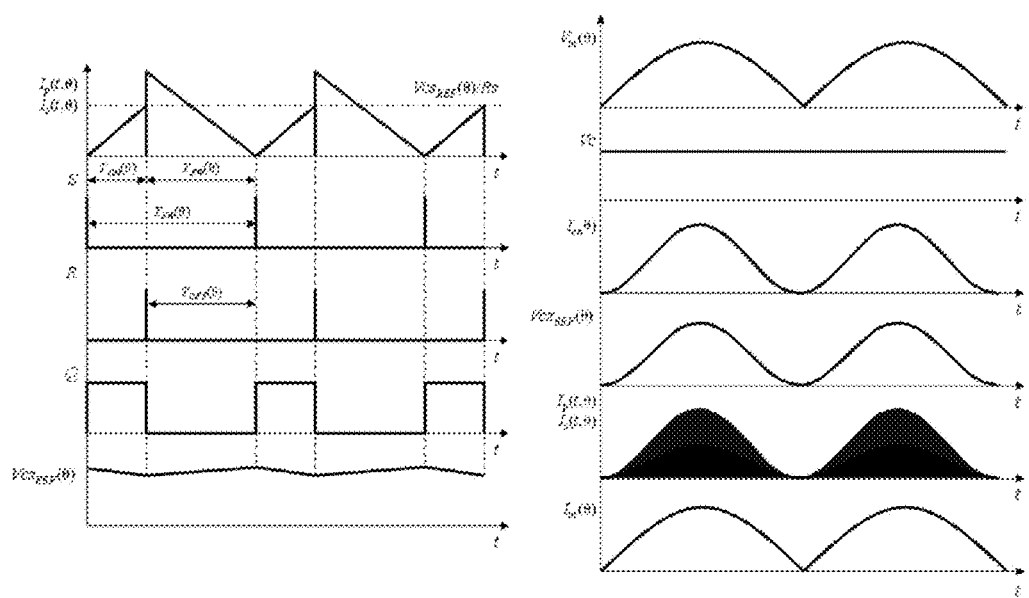
FIG. 8 illustrates waveforms of the circuit in FIG. 7 during normal operation.

FIG. 8 shows the waveforms of the converter 100A of FIG. 7. On the left-hand side are the waveforms on a switching period time scale, on the right-hand side the waveforms on a line cycle time scale.

Figure 9:
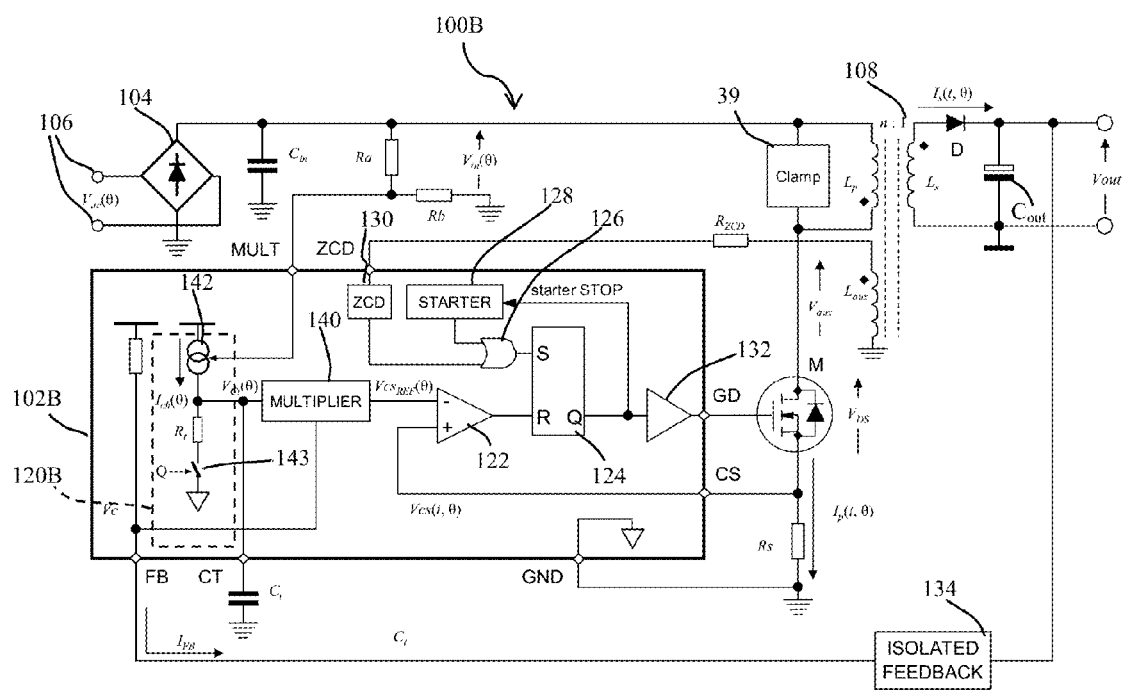
FIG. 9 shows an alternative embodiment of a Hi-PF QR flyback converter according to the present disclosure.

FIG. 9 shows another embodiment of a QR flyback converter 100B according to the present disclosure. The converter 100B is identical to the converter 100A of FIG. 7 except that the converter 100B includes a controller 102B instead of the controller 102A. The controller 102B includes a shaper circuit 120B that has the same components as the shaper circuit 120A of FIG. 7, but the multiplier 140 is connected differently to the components in the two shaper circuits 120A, 120B. In particular, the output of the multiplier 140 is connected to the inverting input of the PWM comparator 122 of the shaper circuit 120B, while the input of the multiplier 140 that is connected to the resistor divider Ra-Rb by the terminal MULT in FIG. 7 is connected to one terminal of the external capacitor $C_t$ in FIG. 9. Unlike the shaper circuit 120A of FIG. 7, the current generator 142 of the shaper circuit 120B of FIG. 9 is directly controlled by the portion of the line voltage $V_{in}(\theta)$ received from the resistor divider Ra-Rb via the pin MULT in the controller 102B. As a result, the current $I_{ch}(\theta)$ produced by the current generator 142 is proportional to the sensed input voltage:

$$I_{ch}(\theta) = g_m K_p (V_{PK} \sin\theta).$$

As in the controller 102A, the capacitor $C_t$ is charged by the current generator 142 and discharged by the switched resistor $R_t$ in the controller 102B. Also in this controller 102B the connection of the input voltage $V_c$ is unchanged from the control voltage $V_c$ of the controller 102A. Similar to the controller 102A, the resistor $R_t$ is connected in parallel to the capacitor $C_t$ by the switch 143 only when the signal Q is high, i.e. during the on-time of the power switch M.

At this point it is clear that a third possible embodiment would have the current generator 142, resistor $R_t$, switch 143, and capacitor $C_t$ connected to the multiplier 140 input where the control voltage $V_c$ is applied, with the current $I_{ch}(\theta)$ of current generator 142 proportional to the control voltage $V_c$. This will be taken for granted and will not be further considered.

Figure 10:
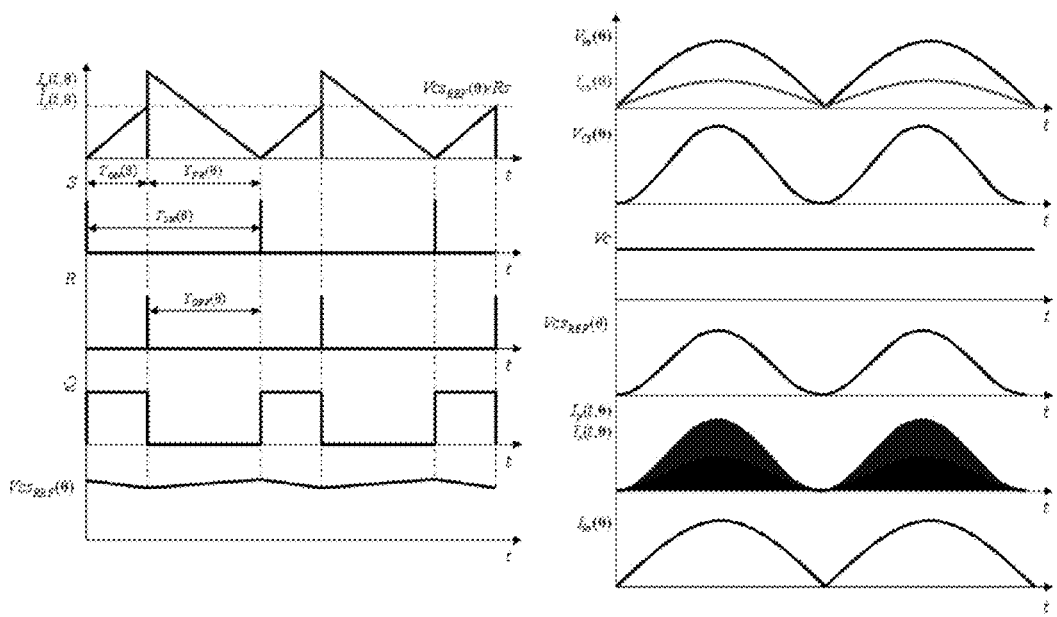
FIG. 10 illustrates waveforms of the circuit in FIG. 9 during normal operation.

FIG. 10 illustrates the waveforms of the circuit of FIG. 9. On the left-hand side are the waveforms on a switching period time scale, on the right-hand side the waveforms on a line cycle time scale.

Figure 11:
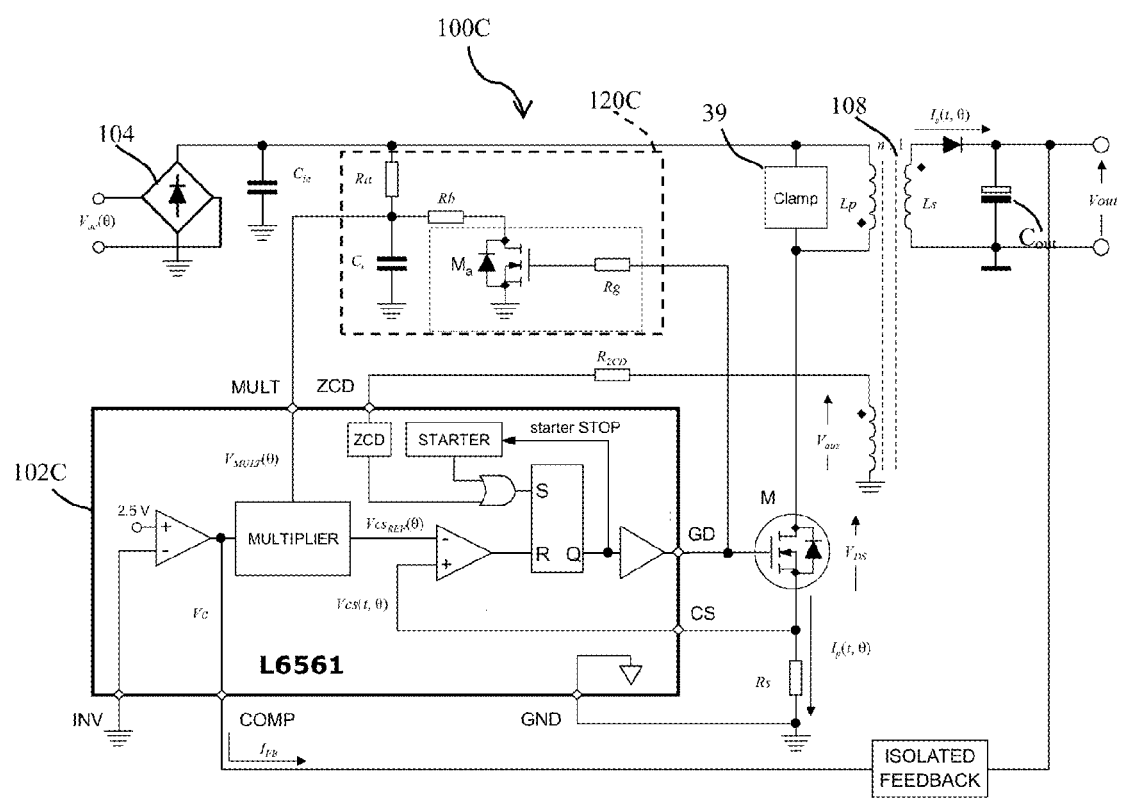
FIG. 11 shows an alternative embodiment of the present disclosure using an existing PFC controller.

FIG. 11 shows another embodiment of a flyback converter 100C, using an existing PFC controller 102C, such as the L6561 available from STMicroelectronics.

In this embodiment, a shaper circuit 120C is implemented with a small-signal MOSFET Ma, its gate resistor Rg, the capacitor $C_t$ and the resistor Rb. A small-signal BJT is also considered for the switch, in place of the small-signal MOSFET.

The MOSFET Ma is driven by the gate driver GD of the power switch M, thus connecting the lower resistor Rb of the divider Ra-Rb to ground during the on-time of the power switch M. Since the input voltage is much larger than the voltage on pin MULT for most of the line cycle, resistor Ra performs as the current generator, producing current $I_{ch}(\theta)$ as:

$$I_{ch}(\theta) \approx \frac{1}{Ra}(V_{PK}\sin\theta).$$

It is a common practice to have a bypass capacitor connected between pins MULT and GND to reduce noise pick-up in a sensitive point such as the multiplier input. The very same capacitor can serve as the capacitor $C_t$ in FIG. 11. The value of the capacitor $C_t$ will preferably be such that $T(\theta) \ll Rb\ C_t \ll 1/f_L$ is fulfilled under all operating conditions.

Figure 12:
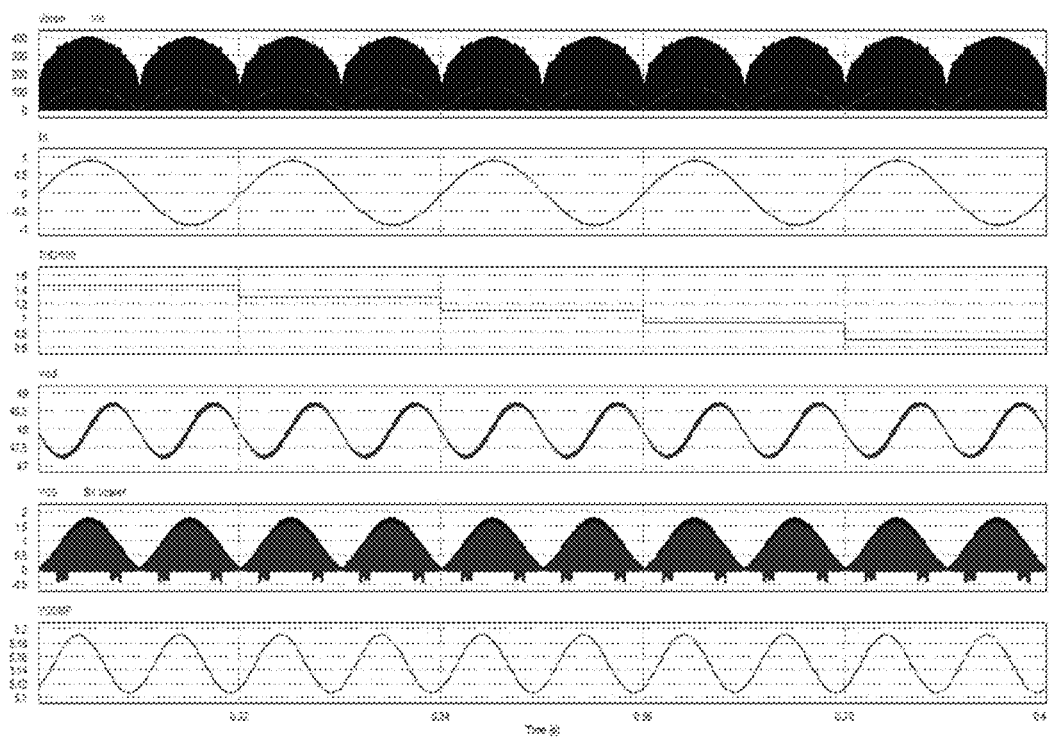
FIG. 12 shows the simulation results for the circuit in FIG. 7 at $V_{in}$=90 VAC and full load.
Figure 13:
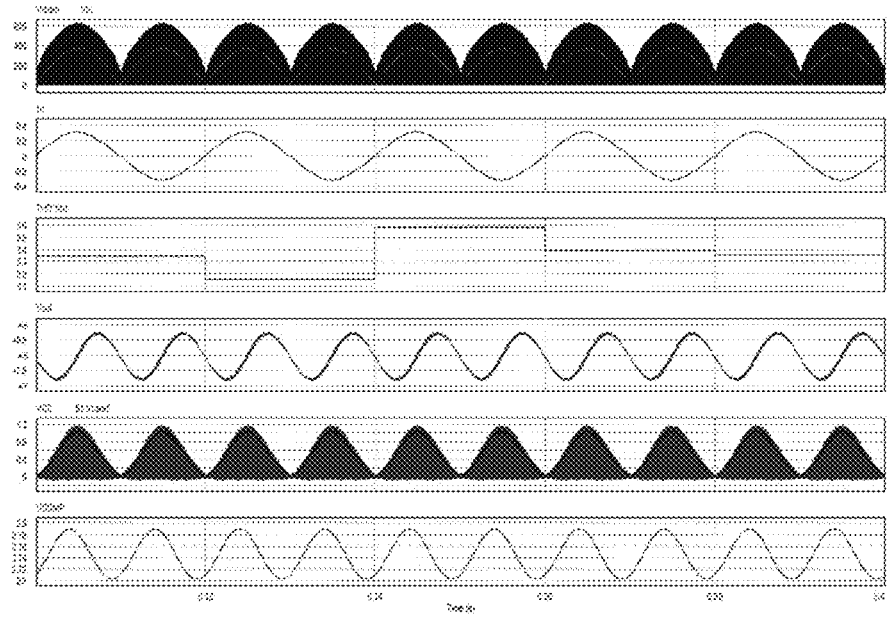
FIG. 13 shows the simulation results for the circuit in FIG. 7 at $V_{in}$=265 Vac and full load.

FIGS. 12 and 13 show computer simulated timing diagrams for the circuit of FIG. 7. These diagrams show a very low distortion level of the input current (around 1% at $V_{in}$=90 Vac, around 3.5% at $V_{in}$=264 Vac), due to the input EMI filter and the nonidealities considered both in the controller 102A and the power elements transformer 108, bridge rectifier 104, and power transistor M.

Figure 14:
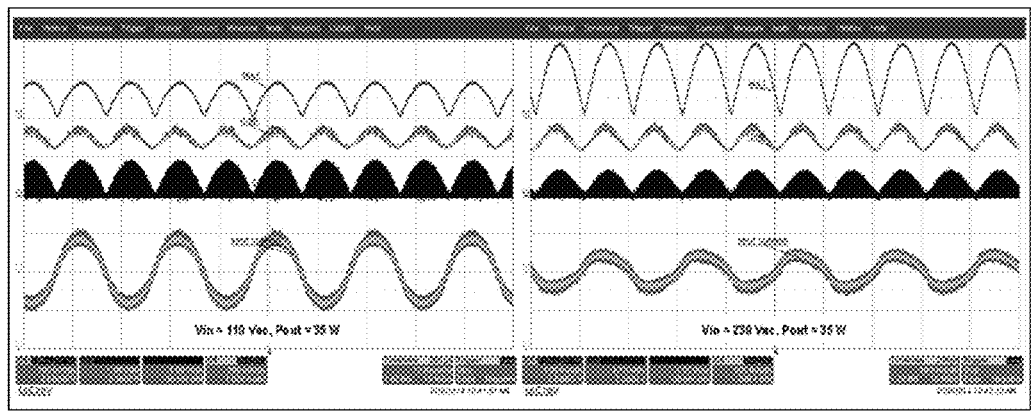
FIG. 14 shows the experimental results on the converter according to the prior art at $V_{in}$=110 Vac (left), and $V_{in}$=230 Vac (right).

FIG. 14 shows an oscilloscope picture with some waveforms taken with the flyback converter 30 of FIG. 1. Note the shape of the input current (green trace), which is a bit more rounded than, a sinusoid @ 110 Vac, while it is more heavily distorted at 230 Vac.

Figure 15:
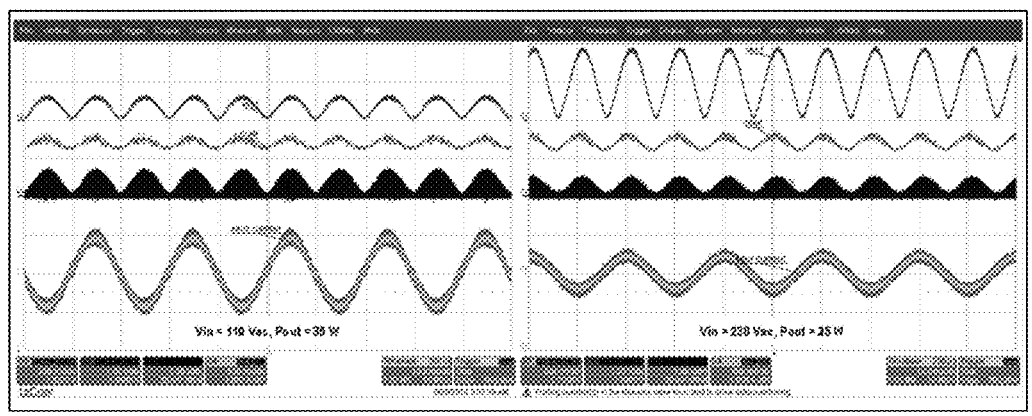
FIG. 15 shows the experimental results on the converter of FIG. 11 at $V_{in}$=110 Vac (left) and at $V_{in}$=230 Vac (right).

FIG. 15 shows the same waveforms as in FIG. 14 on the same controller 38 of FIG. 1 with the addition of the external components switch Ma and gate resistor $R_g$ of FIG. 11. The shape of the input current (the green trace) is almost perfectly sinusoidal both at 110 Vac and 230 Vac.

Figure 16:
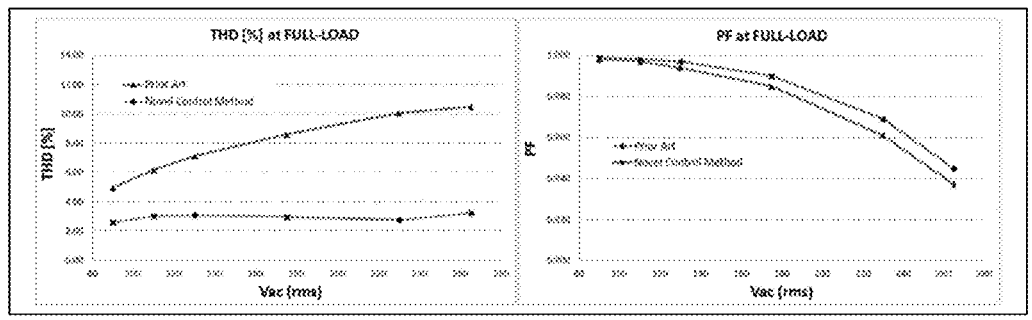
FIG. 16 shows the experimental performance comparison between the prior art method and the embodiment of FIG. 11.

These results are confirmed by the measurements summarized in FIG. 16, which shows a comparison of the values of THD of the input current and the PF in the original and the modified board. The improvement offered by the novel method over the prior art one is dramatic, with a THD less than 4% over the entire input voltage range.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device for controlling a power transistor of a power circuit, comprising:
 a driver circuit having a first input configured to receive a voltage reference signal, and an output configured to drive the power transistor based on the voltage reference signal; and
 a driver control circuit configured to provide the voltage reference signal to the driver circuit, the driver control circuit including:
  a multiplier having a first input configured to receive a first signal based on a feedback signal from the power circuit, a second input configured to receive a second signal, and an output, the multiplier being configured to produce a multiplier signal based on a multiplication of the first and second signals;
  a current generator coupled to the multiplier and configured to produce a current reference signal;
  a first resistor coupled to an output of the first current generator; and
  a switch configured to couple the first resistor in parallel with a capacitor when the power transistor is on, and wherein the driver control circuit is configured to provide the voltage reference signal based on the current reference signal, and a resistance of the first resistor, and a capacitance of the capacitor.

2. The device of claim 1, comprising:
 the capacitor, which is coupled between the first current generator and a supply voltage terminal, wherein the switch and first resistor are coupled between the first current generator and the supply voltage terminal.

3. The device of claim 1, wherein the current generator and the first resistor are configured to provide the second signal to the second input of the multiplier and the multiplier is configured to output the voltage reference signal to the driver circuit.

4. The device of claim 3, wherein the current generator includes a control terminal configured to receive a control voltage from an input circuit of the power circuit, the control voltage being based on a rectified input voltage of the power circuit.

5. The device of claim 1, wherein the multiplier is configured to receive the second signal from an input circuit of the power circuit, the second signal being based on a rectified input voltage of the power circuit.

6. The device of claim 1, wherein the current generator includes:
 a second resistor coupled between a rectifier and the second input of the multiplier.

7. The device of claim 6, wherein the first resistor is coupled between the second resistor and the switch.

8. The device of claim 1, wherein the current generator includes a control terminal coupled to the output of the multiplier and is configured to provide the voltage reference signal to the driver circuit.

9. The device of claim 1, wherein the driver circuit includes:
 a comparator having a first input to an output of the driver control circuit, a second input configured to receive a sense signal indicative of a current though the power switch, and an output;
 a flip-flop having a reset input, coupled to the output of the comparator, and an output; and
 a driver having an input coupled to the output of the flip-flop and an output configured to control the power switch.

10. A device for controlling a driver of a power circuit, comprising:
 a multiplier having a first input configured to receive a first signal based on a feedback signal from the power circuit, a second input configured to receive a second signal based on an input signal from the power circuit, and an output, the multiplier being configured to produce a multiplier signal based on a multiplication of the first and second signals;

a current generator coupled to the multiplier and configured to produce a current reference signal;

a capacitor coupled between the first current generator and a supply voltage terminal;

a first resistor coupled to an output of the first current generator; and a switch configured to couple the first resistor in parallel with the capacitor when the power transistor is on.

11. The device of claim 10, wherein the current generator and the first resistor are configured to provide the second signal to the second input of the multiplier and the multiplier is configured to output a voltage reference signal to the driver.

12. The device of claim 10, wherein the current generator includes a control terminal coupled to the output of the multiplier and is configured to provide a voltage reference signal to the driver.

13. The device of claim 10, wherein the current generator includes:

a second resistor coupled between a rectifier and the second input of the multiplier.

14. A system, comprising:

a rectifier having an input and configured to output a rectified voltage;

a transformer having a primary winding configured to receive a sinusoidal input current from the rectifier;

a power transistor coupled to the primary winding of the transformer and configured to drive the transformer;

a driver circuit configured to drive the power transistor based on a voltage reference signal;

a control circuit configured to produce the voltage reference signal, having:

a multiplier having a first input configured to receive a first signal, a second input configured to receive a second signal based on the rectified voltage, and an output at which the multiplier is configured to produce a multiplier signal based on a multiplication of the first and second signals;

a current generator coupled to the multiplier and configured to output a reference current;

a first resistor coupled to an output of the first current generator;

a capacitor coupled between the current generator and a supply voltage terminal; and a switch configured to couple the resistor in parallel with the capacitor when the power transistor is on.

15. The system of claim 14, wherein the driver circuit includes:

a comparator having a first input coupled to an output of the control circuit, a second input configured to receive a sense signal indicative of a current though the power transistor, and an output;

a flip-flop having a reset input, coupled to the output of the comparator, and an output; and a driver having an input coupled to the output of the flip-flop and an output configured to control the power transistor.

16. The system of claim 14, wherein the current generator and the first resistor are configured to provide the first signal to the first input of the multiplier, the multiplier being configured to provide the voltage reference signal to the driver circuit.

17. The system of claim 14, wherein the current generator includes a control terminal coupled to the output of the multiplier.

18. The system of claim 14, wherein the current generator includes a control terminal configured to receive a control voltage from an input circuit of the power circuit, the control voltage being based on a rectified input voltage of the power circuit.

19. The system of claim 14, wherein the multiplier is configured to receive the second signal from an input circuit of the power circuit, the second signal being based on a rectified input voltage of the power circuit.

20. The system of claim 14, wherein the current generator includes:

a second resistor coupled between the rectifier and the second input of the multiplier.

* * * * *

UNITED STATES PATENT AND TRADEMARK OFFICE
CERTIFICATE OF CORRECTION

| | | |
|---|---|---|
| PATENT NO. | : 9,520,796 B2 | Page 1 of 1 |
| APPLICATION NO. | : 14/572638 | |
| DATED | : December 13, 2016 | |
| INVENTOR(S) | : Claudio Adragna et al. | |

It is certified that error appears in the above-identified patent and that said Letters Patent is hereby corrected as shown below:

On the Title Page

Item (*) Notice:
Delete "This patent is subject to a terminal disclaimer,"

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*